4/23/85 OR 4,513,315

United States Patent [19]

Dekker et al.

[11] Patent Number: 4,513,315

[45] Date of Patent: Apr. 23, 1985

[54] COMMUNITY ANTENNA TELEVISION ARRANGEMENT FOR THE RECEPTION AND DISTRIBUTION OF TV - AND DIGITAL AUDIO SIGNALS

[75] Inventors: Cornelis B. Dekker; Lodewijk B. Vries, both of Eindhoven, Netherlands

[73] Assignee: U.S. Philips Corporation, New York, N.Y.

[21] Appl. No.: 383,907

[22] Filed: Jun. 1, 1982

[30] Foreign Application Priority Data

Jun. 25, 1981 [NL] Netherlands ........................ 8103064

[51] Int. Cl.³ ............................................ H04N 7/18

[52] U.S. Cl. ...................................... 358/86; 370/77; 370/50

[58] Field of Search .................. 455/21, 3, 6; 370/77, 370/50, 4; 381/2; 371/37; 358/86, 142, 143, 144

[56] References Cited

U.S. PATENT DOCUMENTS

| | | | |
|---|---|---|---|
| 3,021,384 | 2/1962 | Brown | 370/77 |
| 3,423,520 | 1/1969 | Kelly | 370/77 |
| 3,889,063 | 6/1975 | Slavin | 370/50 |
| 4,052,563 | 10/1977 | Noda et al. | 370/77 |
| 4,320,511 | 3/1982 | Koga et al. | 371/37 |
| 4,382,266 | 5/1983 | Panzer | 358/86 |
| 4,484,218 | 11/1984 | Boland et al. | 358/86 |

*Primary Examiner*—Michael A. Masinick
*Assistant Examiner*—Edward L. Coles
*Attorney, Agent, or Firm*—Thomas A. Briody; William J. Streeter; Edward W. Goodman

[57] ABSTRACT

Community antenna television arrangement for the reception and distribution of TV signals and digital audio signals, in particular signals which are transmitted per satellite, including a head-end connected to a receiving antenna and a signal distribution network, a time-division multiplex signal which comprises the digital audio signals in a time-multiplex distribution, being applied to the head-end, which time-division multiplex signal is modulated on a sound carrier, the bit rate of the digital audio signals to be distributed being reduced in the head-end of the community antenna television arrangement by a TDM/FDM conversion in order to reduce signal echoes.

6 Claims, 4 Drawing Figures

COMMUNITY ANTENNA TELEVISION ARRANGEMENT FOR THE RECEPTION AND DISTRIBUTION OF TV - AND DIGITAL AUDIO SIGNALS

BACKGROUND OF THE INVENTION

The invention relates to a community antenna television arrangement for the reception and distribution of TV signals and digital audiosignals, particularly those signals which are transmitted by satellite, comprising a head end, connected to a receiving antenna and a signal distribution network, a time-division multiplex signal which comprises said digital audio signals in a time-division multiplex distribution being applied to said head-end, which time-division multiplex signal is modulated on a sound carrier, and also to a receiver for connecting to such a community antenna television arrangement.

The above-mentioned community antenna television arrangement is known from the report 'Investigation of Sound Program Transmission via TV Broadcast Satellites", published by AEG-Telefunken in November 1979.

In this report the prior art community antenna television arrangement is described in connection with a method for the transmission of digital audio signals via broadcast satellites. In this transmission method, designated method D in the report, n digital audio signals to be transmitted are assembled in an earth-based transmitter station to form a time-division multiplex signal which is modulated on a sound carrier of approximately 18 GHz and transmitted to a geostationary broadcasting satellite. There the frequency of the modulated time-division multiplex signal is converted to a frequency region near 12 GHz and transmitted after a predetermined signal amplification to an earth-based receiving station. In this earth-based receiving station a frequency conversion to a frequency region near 1 GHz is effected and the time-division multiplex signal is applied to a head end which forms part of the community antenna television arrangement. Herein the modulated time-division multiplex signal is in its totality converted to a frequency region between 68 and 87.5 MHz and thereafter applied via the signal distribution network to a plurality of receivers which, for processing the received time-division multiplex signal, must comprise a tuning device, a demultiplexer, a selection device and a digital-/analog converter.

In this transmission method D, the transmission capacity in the satellite path, that is to say the path between the earth-based transmitter station and the earth-based receiver station is much greater than the transmission capacity of the community antenna television arrangement. By maximizing the last-mentioned transmission capacity, the overall transmission capacity, that is to say the transmission capacity from earth-based transmitter station to the subscribers' connection to the community antenna television arrangement can be optimized.

SUMMARY OF THE INVENTION

It is an object of the invention to provide a community antenna television arrangement which has a considerably greater transmission capacity compared with the prior art community antenna arrangement, with which an optimization of the overall transmission capacity can be accomplished.

According to the invention, a community antenna television arrangement of the type described in the opening paragraph is characterized in that the head-end comprises a demodulation arrangement for demodulating the time-division multiplex signal to the baseband, a demultiplexing arrangement for demultiplexing the time-division multiplex signal, the demultiplexing arrangement having parallel outputs at which the digital audio signals are available in parallel, which outputs are connected to modulators of a modulation arrangement for modulating the digital audio signals on separate audio carriers, the modulation arrangement being connected to the signal distribution network for applying the digital audio signals to a plurality of subscribers' connecting points.

The invention is based on the recognition that the maximum bit rate of the time-division multiplex signal to be transmitted, which in the method D is the determining factor for the transmission capacity, in the signal distribution network of the majority of existing community antenna television arrangements is not limited by the size of the available frequency range but by the signal echoes which occur in the signal distribution network as a result of imperfect impedance matchings occurring in practice. The time-division multiplex signal with a bit rate (approximately 20M bit/sec) which is the maximum permissible rate as regards said frequency range (from 68 to 87.5 MHz) is disturbed by such signal echoes to such an extent that an effectual suppression of the disturbances by means of simple echo cancellers is not possible.

When the measure in accordance with the invention is used, the received time-division multiplex signal is converted in the head-end into a frequency-divided multiplex signal. The bit rate of the last-mentioned frequency-division multiplex signal is at least equal to the bit rate of one single digital audio signal (approximately 1M bit/sec) which is a factor equal to the number of audio signals in the time-division multiplex signal lower than the bit rate of the received time-division multiplex signal. The disturbing effect of the signal echoes occurring in practice is very small at such low bit rates and can, if necessary, be cancelled by means of a simple prior art echo canceller in a receiver which is connected to the subscriber's connection of the signal distribution network.

Converting a time-division multiplex signal into a frequency-division multiplex signal is known per se from the German Patent Application No. 2,840,256, which has been laid open to public inspection. However, the recognition of using such a conversion in a community antenna arrangement of the type described in the opening paragraph in order to obtain therewith an increase in the transmission capacity is not mentioned in this German Patent Application.

It is also known per se to use a frequency-division multiplex distribution of digital audio signals in a community antenna arrangement as part of a transmission method, which is designated method C in the above-mentioned AEG-Telefunken report. Therein, a frequency-division multiplex transmission of digital audio signals is not only effected in the community antenna television arrangement but also in the satellite path preceding it. In the head-end of the community antenna arrangement, a broad-band frequency conversion is performed, the received frequency-division multiplex signal being shifted in its totality to said continuous frequency range between 68 and 87.5 MHz. The form of modulation of the received frequency-division multiplex signal which is adapted to the transmission properties of the satellite trajectory remains the same.

From experiments it has been found that, measured at the same signal quality, fewer audio signals can be transmitted with the frequency-division multiplex transmission methoc C than with the time-division multiplex transmission method D. Furthermore, in the method C the transmission capacity of the satellite path is considerably smaller than that of the community antenna arrangement. Consequently, in this method C an increase in the transmission capacity of a community antenna arrangement does not have any effect on the overall transmission capacity from the earth-based transmitter station to the subscriber's connection.

The measure in accordance with the invention eliminates the restriction of the transmission capacity of the signal distribution network of the community antenna television arrangement in accordance with the invention because of signal echoes and thus increases the overall transmission capacity from the earth-based transmitter station to the subscriber's connection. Furthermore, in the head-end of the community antenna television arrangement in accordance with the invention, the digital audio signals are available separately and in the baseband. This creates the possibility to choose, for the remodulation of the digital audio signals in the modulation arrangement, a method in which an optimum use is made of the available frequency range, which is not necessarily continuous, as well as an optimum adaptation is obtained as regards the transmission properties of the signal distribution network.

Therefore, a preferred embodiment of a community antenna television arrangement in accordance with the invention is characterized in that the modulation frequencies of the said modulators are located in several, mutually separate non-occupied frequency regions in or near the standard VHF and UHF bands.

When this measure is used, use is made of the freedom of choice on remodulation of the digital audio signals as regards the frequency of audio carriers, so that in principle all the non-occupied frequency regions within the transmission band of the signal distribution network can be utilized for the transmission of the audio signals.

Another preferred embodiment of a community antenna arrangement in accordance with the invention is characterized in that an encoder circuit is arranged between the demultiplexing arrangement and the modulation arrangement for coding the digital audio signals in discrete multi-level signals, which after modulation are matched to the transmission properties of the signal distribution network.

Herein use is made of the freedom of choice at the remodulation of digital audio signals as regards the modulation waveform of the modulated audio signals. When this measure is used, the audio signals are not modulated in binary form on the audio carriers, but in a discrete multi-level form such as, for example, described in the book "Data transmission" by W. R. Bennet and J. R. Davey, published in 1975 by McCraw Hill Book Company and the book "Principles of Data Communication" by R. W. Lucky, J. Salz, E. J. Welden Jr, published in 1968 by Mc.Graw Hill Book Company. With such a modulation waveform, the bandwidth required for each audio signal can be limited to a minimum, which results in a further increase in the transmission capacity of the signal distribution network.

A further preferred embodiment of a community antenna television arrangement in accordance with the invention, the received digital audio signal being coded in an error correcting code, is characterized in that the demultiplexing arrangement is connected to an error-correcting decoding arrangement.

When this measure is used, the redundancy in the received digital audio signals for the purpose of error correction in the head-end is eliminated, so that with the transmission capacity available in the signal distribution network more audio information can be transmitted.

DESCRIPTION OF THE DRAWING

The invention will be described in greater detail by way of example with reference to the Figures shown in the accompanying drawing.

Herein.

DESCRIPTION OF THE PREFERRED EMBODIMENTS

Figure 1:
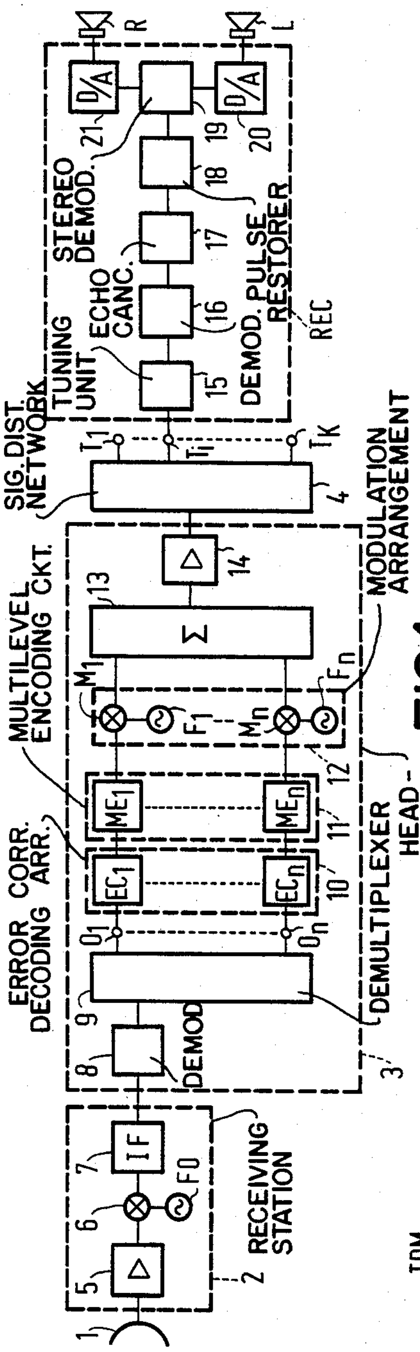
FIG. 1 is a community antenna television arrangement in accordance with the invention.

FIG. 1 shows a community antenna television arrangement 1–4 in accordance with the invention, comprising, coupled one after the other to a receiving antenna 1, an earth-base receiving station 2, a head end 3 and a signal distribution network 4 with subscriber's connections $T_1$–$T_K$. An audio signal receiver REC is coupled to a subscriber's connection $T_i$.

In the community antenna television arrangement 1–4 shown, the circuits for the purpose of processing the TV signals are not shown. In short, such a signal processing includes selection, demodulation, remodulation and amplification of the received TV signals, followed by a distribution together with the audio signals. Knowledge about the TV-signal processing in such a community antenna television arrangement is not necessary for understanding the invention. For the sake of clarity, a further description thereof is omitted.

The receiving antenna 1 receives a satellite signal which, in the transmission method D as described in the above-mentioned AEG-Telefunken report, incorporates inter alia a time-division multiplex signal which is modulated on a sound carrier of approximately 12 GHz in a 4 PSK-modulation method. Via a broad-band input amplifier 5 of the earth-base receiving station 2 the received satellite signal is applied to a first mixing stage 6 in which, by means of a fixed-frequency oscillator FO connected to the mixing stage 6, a first frequency conversion of the received 4 PSK-modulated 12 GHz sound carrier to an intermediate frequency of approximately 1 GHz is performed. The mixing stage 6 is connected to an intermediate-frequency selection circuit 7 having a bandwidth of 27 MHz in which a selection of the intermediate frequency time-division multiplex signal is performed. Thereafter, the intermediate-frequency time-division multiplex signal is applied to a 4-PSK demodulation arrangement 8 of the head end 3 in which in known manner the intermediate frequency time-division multiplex signal is demodulated to the baseband. Such a demodulation arrangement is described in the book "Digital Communications by Satellite", by James J. Spilker, Jr. published by Prentice-Hall (Electrical Engineering Series 1977).

Figure 2:
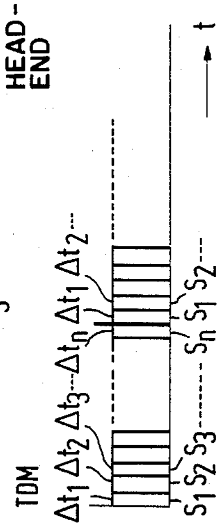
FIG. 2 shows the transmitted baseband time-division multiplex signal comprising n digital audio signals.

The binary baseband time-division multiplex signal thus obtained is shown in FIG. 2 and consists of a repetitive time-pattern which is formed by n windows in which in known manner the bit values of n-digital audio signals occur sequentially in a predetermined sequence. Thus, the first window of the sequential time-pattern contains the sequential bit values of the digital audio signal $S_1$, the second window the sequential bit values of the digital audio signal $S_2$, etc., and the bit rate of the time-division multiplex signal is n times the bit rate of a single digital audio signal.

The baseband time-division multiplex signal is demultiplexed in known manner in a demultiplexing arrangement 9 connected to the demodulation arrangement 8. Such a demultiplexing arrangement is known per se from the abovementioned book "Digital Communications by Satellite". The demultiplexing arrangement 9 has n parallel outputs $O_1$–$O_n$ in which the n digital audio signals of the time-division multiplex signal are separately and simultaneously available.

The digital audio signals may have been coded in an error-correcting code in order to reduce the errors occurring in the satellite path, not shown, due to disturbances in the received digital audio signals. In that even an error reduction is effected in known manner in the error correction circuits $EC_1$ to $EC_n$, inclusive of an error-correcting decoding arrangement 10, which is connected to the respective outputs $O_1$ to $O_n$, inclusive. The error-correcting decoding is of course matched to the error-correcting code used, which may be a block or convolution code, and removes the redundancy which resulted from the error correcting coding of the digital audio signals. As a result thereof the bit rate of the digital audio signals $S_1$ to $S_n$, inclusive at the outputs of the error-correcting decoding arrangement 10 is lower than at the outputs $O_1$ to $O_n$, inclusive of the demultiplexing arrangement 9.

For the remodulation of the digital audio signals $S_1$–$S_n$ the error correction circuits $EC_1$ to $EC_n$, inclusive are connected to respective modulators $M_1$ to $M_n$, inclusive of a modulation arrangement 12 via multilevel encoders $ME_1$ to $ME_n$, inclusive of a discrete multilevel encoding circuit 11. The modulators $M_1$ to $M_n$ are connected to respective audio-carrier oscillators $F_1$ to $F_n$, inclusive, which produce audio carriers having the respective frequencies $F_1$ to $F_n$, inclusive.

The multi-level encoders $ME_1$ to $ME_n$, inclusive, convert the binary or two-level reproduction of the n digital audio signals into an 8-level signal reproduction. To this end a certain signal level is assigned to every combination of 3 bits of the binary audio signal. These 8 discrete signal levels have been chosen such that multiplying the discrete multi-level signals obtained at the outputs of the multi-level encoding circuit 11 by the respective audio carrier frequencies $f_1$ to $f_n$, inclusive, in the modulators $M_1$ to $M_n$, inclusive results in an 8-PSK modulation of the digital audio signals $S_1$–$S_n$ on the said audio carriers.

Such an 8-PSK modulation is known per se from the book "Data transmission" by W. R. Bennet and J. R. Davey, published in 1975 by McGraw Hill Book Company, and has for its purpose to narrow the required band bandwidth per audio signal.

Figure 3:
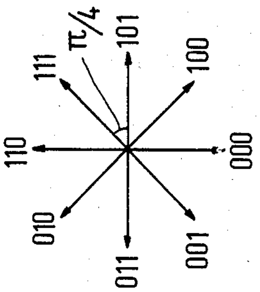
FIG. 3 shows a possible assignment of binary signal combinations to 8 phase angles of an audio carrier for the purpose of multilevel coding of the digital audio signals.

FIG. 3 shows a possible relationship in 8-PSK modulation of an audio carrier between the respective 8 different phases of the relevant, modulated audio carrier in such a modulation method and the 8 different 3-bit combinations of a binary audio signal.

Thereafter the n 8-PSK modulated audio carriers at the outputs of the modulators $M_1$ to $M_n$, inclusive are added together in an adder arrangement 13 and are mutually added to TV signals to be distributed. Thus, at the output of the adder circuit 13 there is obtained a frequency-division multiplex signal which comprises the n digital audio signals in a frequency distribution as shown in, for example, FIG. 4.

Figure 4:
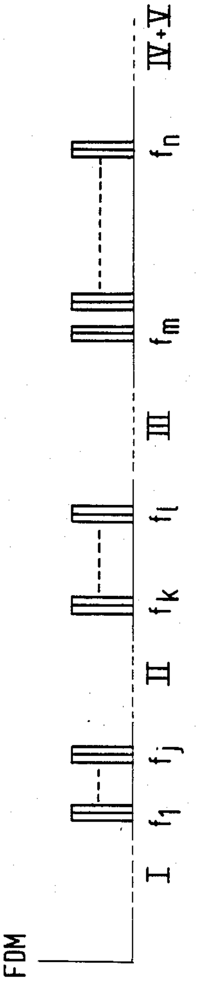
FIG. 4 shows the frequency-division multiplex signal which is formed in the head-end of the community antenna arrangement of FIG. 1 and comprises the information of the said n digital audio signals.

This FIG. 4 shows a frequency distribution of the audio carriers $F_1$ to $F_n$, respectively over the unoccupied frequency regions between the standard frequency bands I to IV inclusive. The audio carriers $F_1$ to $F_j$, inclusive, are located between 68 MHz and 87.5 MHz; $F_k$ to $F_1$, inclusive, are located between 104 MHz and 174 MHz; and $F_m$ to $F_n$, inclusive, between 230 MHz and 470 MHz. It is of course alternatively possible to select the audio carrier frequencies in unoccupied positions within the standard frequency bands or even thereabove. The frequency-divided multiplex signals is applied via a broad-band amplifier 14 to the signal distribution network 4, in which signal distribution to a number of subscribers' connections $T_1$ to $T_n$, inclusive takes place.

An audio signal receiver REC connected to a subscriber's connecting point $T_i$ comprises, arranged one after the other, a tuning unit 15, an 8-PSK demodulator 16, an echo canceller 17, a pulse restorer 18, a stereo demodulator 19 having stereophonic left-hand and right-hand outputs which are connected via digital analog converters 20 and 21 to respective loudspeakers L and R. These circuits are known per se. The tuning unit 15 is tunable to the audio carrier frequencies $F_1$ to $F_n$, inclusive for tuning to and selection of a desired audio signal. The selected 8-PSK-modulated audio carrier is demodulated in the 8-PSK demodulator so that the binary audio signal is recovered in the baseband. The echo effects in this binary audio signal are cancelled in the echo canceller 17. Such an echo canceller is described in the article "A one chip automatic equilizer for echo reduction in Teletext", by J. O. Voorman, P. J. Snyder, P. J. Barth and J. S. Vromans, published in IEEE Proceedings of Consumer Electronics Chicago, June 1981.

The signal echoes produced in high-grade signal distribution networks, in which mismatches do not occur, or only occur to a very small extent, may be so few that cancellation thereof is not necessary. In that event the echo canceller 17 may be dispenses with.

Thereafter, the pulse shape of the binary audio signal is restored in the pulse restorer 18. The left-hand and right-hand stereo signals are separated from the audio signal by means of the stereo demodulator 19, whereafter the left-hand and right-hand stereo signals are applied to the loudspeakers L and R by means of a separate digital/analog conversion in the digital/analog converter 20 and 21.

It will be clear that the invention is not only limited to the described 8-PSK modulation methods. The invention may also be used with other modulation methods in which a different phase quantization is used (4, 16 or even 32 PSK), possibly combined with an amplitude quantization of the audio carrier. Modulation methods of this type are known per se from the article "Microprocessor implementation of high speed data-modems", by P. van Gerwen, published in I.E.E.E. Transaction on Communications, February, 1977, pages 238–250. In general the required bandwidth decreases at an increasing phase and/or amplitude quantization. This may, however, make the modulation arrangement and the receivers much more complicated and considerably increase the cost price of the modulation arrangement and of the receivers, and also the sensitivity of the modulated audio signals to signal echoes. The number of practically usuable modulation methods is inter alia limited thereby.

Another use of the invention becomes possible if the digital audio signals are not individually and separately modulated on an audio carrier, but by combining m (wherein m is at least 2 and not more than $n-1$) audio signals to form a time-division multiplex signal and by modulating this time-division multiplex signal on an audio carrier. The remaining n-m audio signals may then be modulated separately or combined as one or more time-division multiplex signals on one or more other audio carriers. This can be realized by providing a time multiplexing arrangement suitable therefore between the demultiplexing arrangement 9 and the modulation arrangement 12. The bit rate reduction at such an "incomplete" time multiplex-frequency multiplex conversion, not shown, is indeed less than for a complete time multiplex-frequency multiplex conversion, such as used in the embodiment of FIG. 1, but may be sufficiently great for qualitatively good signal distribution networks to reduce the disturbing effects of signal echoes to a satisfactory extent.

What is claimed is:

1. A community antenna television arrangement for the reception and distribution of TV signals and digital audio signals, particularly those signals which are transmitted by satellite, comprising a head-end, connected to a receiving antenna and a signal distribution network, a time-division multiplex signal which incorporates said digital audio signals in a time-division multiplex distribution being applied to said head end, which time-division multiplex signal is modulated on a sound carrier, characterized in that the head-end comprises a demodulation arrangement for demodulating the time-division multiplex signal to the baseband, a demultiplexing arrangement for demultiplexing the time-division multiplex signal, this demultiplexing arrangement having parallel outputs at which the digital audio signals are available in parallel, which outputs are connected to modulators of a modulation arrangement for modulating the digital audio signals on separate audio carriers, the modulation arrangement being connected to the signal distribution network for applying the digital audio signals to a plurality of subscribers' connecting points.

2. A community antenna television arrangement as claimed in claim 1, characterized in that the modulation frequencies of the said modulators are located in several, mutually separated, non-occupied frequency regions in or near the standard VHF and UHF bands.

3. A community antenna television arrangement as claimed in claim 1 or claim 2, characterized in that between the demultiplexing arrangement and the demodulation arrangement an encoding circuit is arranged for coding the digital audio signals into discrete multi-level signals, which after modulation are adapted to the transmission properties of the signal distribution network.

4. A community antenna arrangement as claimed in claim 3, the digital audio signals of the received time-division multiplex signals having been coded in an error-correcting code, characterized in that the demultiplexing arrangement is connected to an error-correcting decoding arrangement.

5. A receiver for connection to a community antenna television arrangement as claimed in claim 1.

6. A receiver as claimed in claim 5, characterized in that said receiver comprises an echo canceller connected to a tuning unit for reducing echoes in the received digital audio signal.

* * * * *